(12) United States Patent
Nagashima

(10) Patent No.: US 7,502,301 B2
(45) Date of Patent: Mar. 10, 2009

(54) DIFFRACTION GRATING FOR PLURAL WAVELENGTHS, OPTICAL PICKUP APPARATUS AND OPTICAL DISK APPARATUS USING DIFFRACTION GRATING FOR PLURAL WAVELENGTHS

(75) Inventor: Kenji Nagashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 498 days.

(21) Appl. No.: 10/854,645

(22) Filed: May 27, 2004

(65) Prior Publication Data

US 2004/0264859 A1 Dec. 30, 2004

(30) Foreign Application Priority Data

May 28, 2003 (JP) .......................... P 2003-150024

(51) Int. Cl.
*G11B 7/00* (2006.01)
(52) U.S. Cl. .............................. 369/112.11; 369/109.02
(58) Field of Classification Search ........................ None
See application file for complete search history.

(56) References Cited

U.S. PATENT DOCUMENTS

| | | | |
|---|---|---|---|
| 4,797,870 A * | 1/1989 | Nagai et al. ............ | 369/112.05 |
| 5,283,690 A * | 2/1994 | Miyake et al. .............. | 359/569 |
| 6,980,504 B2 * | 12/2005 | Yukawa .................. | 369/112.12 |
| 2002/0097660 A1 * | 7/2002 | Komma et al. .......... | 369/112.04 |
| 2004/0131949 A1 * | 7/2004 | Kurihara et al. ................. | 430/5 |
| 2004/0196556 A1 * | 10/2004 | Cappiello ................... | 359/569 |
| 2005/0185539 A1 * | 8/2005 | Shimano et al. .......... | 369/44.37 |

FOREIGN PATENT DOCUMENTS

| | | |
|---|---|---|
| JP | 2001-155375 | 6/2001 |
| JP | 2001-281432 | 10/2001 |
| JP | 2004-327005 | 11/2004 |

\* cited by examiner

*Primary Examiner*—Joseph H Feild
*Assistant Examiner*—Parul Gupta
(74) *Attorney, Agent, or Firm*—Morgan, Lewis & Bockius LLP

(57) ABSTRACT

A diffraction grating for plural wavelengths includes first grating regions which have periodic protrusions and depressions in sectional shape and are long formed in a depth direction perpendicular to a repeat direction of the protrusions and depressions, and second grating regions which have a configuration similar to that of the first grating regions and have depressions set to depths different from groove depths of the depressions of the first grating regions. The first and the second grating regions are alternately placed, and groove depths of each the depressions of both the grating regions are set so that the first grating regions transmit incident light of a first wavelength and also diffract incident light of a second wavelength different from the first wavelength and the second grating regions transmit incident light of the second wavelength and also diffract incident light of the first wavelength.

6 Claims, 11 Drawing Sheets

DIFFRACTION GRATING FOR PLURAL WAVELENGTHS, OPTICAL PICKUP APPARATUS AND OPTICAL DISK APPARATUS USING DIFFRACTION GRATING FOR PLURAL WAVELENGTHS

BACKGROUND OF THE INVENTION

1. Field of the Invention

The present invention relates to a diffraction grating for plural wavelengths, an optical pickup apparatus and an optical disk apparatus capable of handling plural wavelengths.

2. Description of the Related Art

At present, an optical record medium includes a medium such as CD-ROM (Compact Disc-Read Only Memory) or CD-R (Compact Disc-Recordable) capable of recording only one time in which a thickness of a base material of a disk is 1.2 mm and a wavelength of semiconductor laser light used in recording and reproduction is a band of 780 nm (nanometer), or a medium such as DVD-ROM (Digital Versatile Disc-Read Only Memory) or DVD-R (Digital Versatile Disc-Recordable) capable of recording only one time in which a thickness of a base material of a disk is 0.6 mm and a wavelength of semiconductor laser light used in recording and reproduction is a band of 650 nm.

As an optical pickup apparatus for handling such various optical record media, an apparatus dedicated to each the optical record medium has been developed. However, as the optical pickup apparatus, it is desirable to be able to reproduce or record both the optical record media of various different kinds of, for example, CD and DVD by the same apparatus. Also, as an optical disk apparatus, it is probably preferable to be able to reproduce or record various optical record media such as CD or DVD by an apparatus into which one pickup apparatus is built, resulting in cost reduction, savings in space and improvement in performance.

Conventionally, as an optical pickup apparatus for satisfying this kind of requirement, an apparatus in which at least two or more semiconductor laser light sources corresponding to each of the optical record media, separately independent objective lenses and light detection systems are placed inside the same cabinet has been used (see FIG. 6 of JP-A-2001-155375). However, such an optical pickup apparatus becomes large-scale and complicated as compared with a normal optical pickup apparatus dedicated to each disk. Also, a rise in price cannot be avoided.

On the other hand, cost reduction, simplification and miniaturization of an optical pickup apparatus have been implemented with an increase of use of optical record media. As a result of this, also in an optical pickup apparatus capable of handling plural kinds of optical record media, shared use of optical parts and a decrease in the number of parts are required. As one example of solving such a problem, for example, a monolithic semiconductor laser for two wavelengths in which a semiconductor laser with a wavelength band of 790 nm and a semiconductor laser with a wavelength band of 650 nm are formed inside one chip or a semiconductor laser for two wavelengths made of plural chips in which laser chips of each wavelength band are placed so that a distance between light emission points is a distance of about 100 to 300 μm has been proposed as a semiconductor laser for emitting light of two wavelengths.

In the case of using these semiconductor lasers for two wavelengths, the number of parts decreases and miniaturization and cost reduction can be achieved. However, when a diffraction grating used for three beam generation in a differential push-pull method or a three beam method is used in combination with the semiconductor laser for two wavelengths in the optical pickup apparatus, even in the case that any light with a wavelength band of 790 nm for CD reproduction or a wavelength band of 650 nm for DVD reproduction enters the diffraction grating, diffracted light is formed, so that a problem that light quantity loss is caused and signal light decreases arises. Also, extra diffracted light may result in stray light to be mixed into a photodetector and a problem that information cannot be recorded and reproduced arises.

As handling of such problems, a technique for providing diffraction gratings of two kinds is disclosed in JP-A-2001-155375. That is, in JP-A-2001-155375, an optical head apparatus using a hologram for two wavelengths in which two diffraction gratings in which one diffraction grating diffracts light of a wavelength λ1 and transmits light of a wavelength λ2 and the other diffraction grating diffracts light of the wavelength λ2 and transmits light of the wavelength λ1 are provided separately in a direction of the optical axis is disclosed. According to the invention of this JP-A-2001-155375, miniaturization and weight reduction are achieved while recording or reproduction can be performed efficiently and stably.

Also, as one example of solving a problem that unnecessary diffracted light is generated from a diffraction grating, in JP-A-2001-281432, it is configured so that unnecessary diffracted light is not generated by being constructed so that a phase difference between a protrusion and a depression is 2π in transmitted light of a first wavelength so as to transmit incident light of a first wavelength and diffract second incident light. Also, a technique in which a diffraction grating having diffraction action on incident light of a wavelength λ2 is provided on one surface of a transparent substrate and another diffraction grating having diffraction action on incident light of a wavelength λ1 is provided on the other surface is disclosed in this JP-A-2001-281432.

In the invention described in JP-A-2001-155375, diffraction grating bodies are required every each wavelength and light emitted from a light source passes through plural diffraction grating bodies and light quantity loss increases and also wave front aberration increases. As a result of this, a signal error tends to occur and a problem tends to arise in terms of performance as an optical disk apparatus. In order to avoid this problem, the need to increase a function of a reproduction circuit portion arises, and there arises a disadvantage in manufacturing efficiency and cost. Also, in the invention described in JP-A-2001-155375, the plural diffraction grating bodies are required, so that the number of parts increases and assembly efficiency becomes worse and also cost increases.

Also, according to each the invention of JP-A-2001-281432, for example, as in the case that focusing by a three beam method is adopted in both of the CD apparatus and the DVD apparatus, for an optical system in which a diffracted light component is required every each wavelength, plural diffraction grating bodies described in JP-A-2001-281432 are required or the need to provide depressions for a diffraction grating on both surfaces of one diffraction grating body arises. When plural diffraction grating bodies are provided, a problem that light quantity loss occurs and wave front aberration increases in each the wavelength arises. Also, the number of parts increases and obstacles to miniaturization, simplification and cost reduction are caused.

On the other hand, in the case of providing depressions on both surfaces of the diffraction grating body, light quantity loss does not increase too much and also an increase in wave front aberration is not large, but the light quantity loss or the wave front aberration increases still as compared with the case of having one diffraction grating. Also, the need to provide depressions on both surfaces of the diffraction grating body arises, and the need to adjust its alignment optimally arises. Further, a grating structure having protrusions and depressions on all of both surfaces of the diffraction grating body is provided, so that a coating for increasing transmittance of light is not applied to both the surfaces and a problem that transmittance of light decreases also arises.

SUMMARY OF THE INVENTION

The invention is implemented to solve the problems described above, and an object of the invention is to provide a diffraction grating for plural wavelengths, an optical pickup apparatus and an optical disk apparatus in which an increase in light quantity loss or wave front aberration is not caused and also transmittance of light can be increased.

In order to achieve the object, in a diffraction grating for plural wavelengths of the invention, first grating regions which have periodic protrusions and depressions in sectional shape and are long formed in a depth direction perpendicular to a repeat direction of the protrusions and depressions and second grating regions which have periodic protrusions and depressions in sectional shape and have the depressions set to depths different from groove depths of the depressions of the first grating regions and are long formed in a depth direction perpendicular to a repeat direction of the protrusions and depressions are alternately placed in a direction perpendicular to an incident direction of light so that all the protrusions and depressions are located in the same surface side and thereby both the grating regions are constructed in striped shape, and groove depths of each the depressions of both the grating regions are set so that the first grating regions transmit incident light of a first wavelength and also diffract incident light of a second wavelength different from the first wavelength and the second grating regions transmit incident light of the second wavelength and also diffract incident light of the first wavelength.

According to the invention, protrusions and depressions forming a grating structure are provided on only one surface of a substrate and in that respect, the invention is similar to a conventional diffraction grating for one wavelength. As a result of this, light quantity loss does not increase and wave front aberration is also similar to that of the conventional diffraction grating for one wavelength. In addition, when the protrusions and depressions of the grating structure are provided on only one surface side, a coating for increasing transmittance of light can be applied to the other surface and the transmittance of light can be increased and also the overall thickness is identical to that of the conventional diffraction grating for one wavelength and miniaturization is achieved. Further, since each of the grating regions are placed in striped shape, an aperture is not limited in a longitudinal direction of each of the grating regions long formed, so that spot quality of a light beam of its direction does not deteriorate and by making effective use of the direction in which the quality does not deteriorate, a predetermined function can be satisfied in the case of being incorporated into an optical disk apparatus etc.

Also, in a diffraction grating for plural wavelengths of another invention, a first grating portion including a first grating region which has periodic protrusions and depressions in sectional shape and a second grating portion including a second grating region which has periodic protrusions and depressions in sectional shape and has the depressions set to depths different from groove depths of the depressions of the first grating portion are adjacently placed in a direction perpendicular to an incident direction of light, and groove depths of each the depressions of both the grating portions are set so that the first grating portion transmits incident light of a first wavelength and also diffracts incident light of a second wavelength different from the first wavelength and the second grating portion transmits incident light of the second wavelength and also diffracts incident light of the first wavelength.

According to the invention, protrusions and depressions forming a grating structure are provided on only one surface with respect to each wavelength and with respect to each of the wavelengths, the invention is similar to a conventional diffraction grating for one wavelength. As a result of this, it can be constructed so that light quantity loss does not increase and wave front aberration is also similar to that of the conventional diffraction grating for one wavelength. In addition, when the protrusions and depressions of the grating structure are provided on only one surface side of a substrate, the overall thickness is identical to that of the conventional diffraction grating for one wavelength and miniaturization is achieved.

Further, in addition to the diffraction grating for plural wavelengths of the invention described above, in another invention, the first grating portion is formed by spacing plural first grating regions which are long formed in a depth direction perpendicular to a repeat direction of the protrusions and depressions, and the second grating regions which are long formed in a depth direction perpendicular to a repeat direction of the protrusions and depressions are adjacently placed between the first grating regions so that all the protrusions and depressions are located in the same surface side, and thereby the first grating portion and the second grating portion are formed in striped shape. In the case of adopting this configuration, since each of the grating regions are placed in striped shape, an aperture is not limited in a longitudinal direction of each of the grating regions long formed, so that spot quality of a light beam of its direction does not deteriorate and by making effective use of the direction in which the quality does not deteriorate, a predetermined function can be satisfied in the case of being incorporated into an optical disk apparatus etc.

Also, in addition to the diffraction grating for plural wavelengths of the invention described above, in another invention, the first grating portion is placed in the center and the second grating portion is placed around the first grating portion. In this configuration, when the first grating portion wants to be placed in the optical axis, the adjustment is facilitated extremely.

Also, in addition to the diffraction grating for plural wavelengths of the invention described above, in another invention, each width of a direction in which the first grating regions and the second grating regions are repeatedly placed is equalized. Thus, the width of a direction in which both the grating regions are repeatedly placed is equalized, so that the quantity of each diffracted light for plural wavelengths can be equalized.

Further, in addition to the diffraction grating for plural wavelengths of the invention described above, in another invention, each width of a direction in which the first grating regions and the second grating regions are repeatedly placed is varied. In this configuration, the quantity of each diffracted light for plural wavelengths can be varied.

Also, a phase plate for changing a phase of at least one of the first wavelength and the second wavelength is preferably placed on a surface. In the case of adopting this configuration, a phase plate can be integrated into a diffraction grating and miniaturization is achieved when this diffraction grating is incorporated into an optical pickup apparatus etc.

Also, in addition to the diffraction grating for plural wavelengths of the invention described above, in another invention, third grating regions having depressions with depths different from the depths of the depressions of the first grating regions and the depths of the depressions of the second grating regions are provided and groove depths of each the depressions of the first and second grating regions and the depressions of the third grating regions are set so that the first grating regions transmit incident light of the first wavelength and a third wavelength different from the first wavelength and the second wavelength and also diffract incident light of the second wavelength and the second grating regions transmit incident light of the second wavelength and the third wavelength and also diffract incident light of the first wavelength and the third grating regions transmit incident light of the first wavelength and the second wavelength and also diffract incident light of the third wavelength. By this configuration, a diffraction grating for three wavelengths can be formed as one member without increasing a thickness and it is highly advantageous in miniaturization.

Also, with an optical pickup apparatus of the invention, in an optical pickup apparatus having a light source portion in which a first semiconductor laser light source and a second semiconductor laser light source for respectively emitting light of a first wavelength and a second wavelength which are at least two different wavelengths are provided inside the same package, a converging optical system in which a first light beam having the first wavelength emitted from the first semiconductor laser light source and a second light beam having the second wavelength emitted from the second semiconductor laser light source respectively pass through an objective lens placed in a position opposed to an optical record medium and thereby each the light beam is caused to converge on the optical record medium, a photodetector for receiving a light beam for detection reflected by the optical record medium and outputting a current, and a light detection optical system for guiding the light beam for detection to the photodetector, the above-mentioned diffraction grating for plural wavelengths is placed between the objective lens and the light source portion of the converging optical system so that a longitudinal direction of each of the grating regions in the objective lens portion is aligned with a radial direction of the optical record medium.

In the optical pickup apparatus of the invention, protrusions and depressions of a grating structure used are provided on only one surface of a substrate and in that respect, the invention is similar to a conventional diffraction grating for one wavelength. As a result of this, light quantity loss does not increase and wave front aberration is also similar to that of the conventional diffraction grating for one wavelength. In addition, since the depressions of the diffraction grating are provided on only one surface side, a coating for increasing transmittance of light can be applied to the other surface and the transmittance of light can be increased and also the overall thickness is identical to that of the conventional diffraction grating for one wavelength and miniaturization is achieved. Further, since this diffraction grating is inserted into the converging optical system, a method such as a three beam method for diffracting a light beam can be implemented with respect to each the wavelength without increasing light quantity loss or wave front aberration and, for example, the three beam method can be adopted for both CD and DVD.

Also, with an optical pickup apparatus of another invention, in an optical pickup apparatus having a light source portion for emitting light of a first wavelength and a second wavelength which are at least two different wavelengths, a converging optical system for respectively causing a first light beam having the first wavelength emitted from the light source portion and a second light beam having the second wavelength emitted from the light source portion to converge on an optical record medium, and a photodetector for receiving a light beam for detection reflected by the optical record medium or passing through the optical record medium and outputting a current, the above-mentioned diffraction grating for plural wavelengths is placed between the light source portion and the photodetector.

According to the invention, protrusions and depressions forming a grating structure are provided on only one surface with respect to each wavelength and with respect to each of the wavelengths, the invention is similar to a conventional diffraction grating for one wavelength. As a result of this, it can be constructed so that light quantity loss does not increase and wave front aberration is also similar to that of the conventional diffraction grating for one wavelength. In addition, when the protrusions and depressions forming the grating structure are provided on only one surface side of a substrate, a coating for increasing transmittance of light can be applied to the other surface and the transmittance of light can be increased and also the overall thickness is identical to that of the conventional diffraction grating for one wavelength and miniaturization is achieved. Further, when the diffraction grating is inserted into the converging optical system, a method such as a three beam method for diffracting a light beam can be implemented with respect to each the wavelength without increasing light quantity loss or wave front aberration and, for example, the three beam method can be adopted for both CD and DVD. Also, a configuration in which a light beam is reflected by an optical record medium and then using this diffraction grating, light is diffracted and is collected to a photodetector can be adopted.

Also, an optical disk apparatus of the invention has the above-mentioned optical pickup apparatus, a slide feed mechanism for moving this optical pickup apparatus in a radial direction of an optical record medium, and a reproduction circuit for outputting a signal from the optical pickup apparatus as a reproduction signal.

In an optical disk apparatus of the invention, depressions of a diffraction grating are provided on only one surface with respect to each wavelength and in that respect, the invention is similar to a conventional diffraction grating for one wavelength with respect to each the wavelength. As a result of this, light quantity loss does not increase and wave front aberration is also similar to that of the conventional diffraction grating for one wavelength. In addition, when protrusions and depressions forming a grating structure are provided on only one surface side of a substrate, the overall thickness is identical to that of the conventional diffraction grating for one wavelength and miniaturization is achieved. Thus, an optical pickup apparatus portion can be miniaturized, so that miniaturization of an optical disk apparatus is also facilitated.

BRIEF DESCRIPTION OF THE DRAWINGS

These and other objects and advantages of this invention will become more fully apparent from the following detailed description taken with the accompanying drawings in which:

FIG. 2A is a partially sectional view taken on line A-A shown in FIG. 1 of a first grating region, and FIG.

Figure 1:
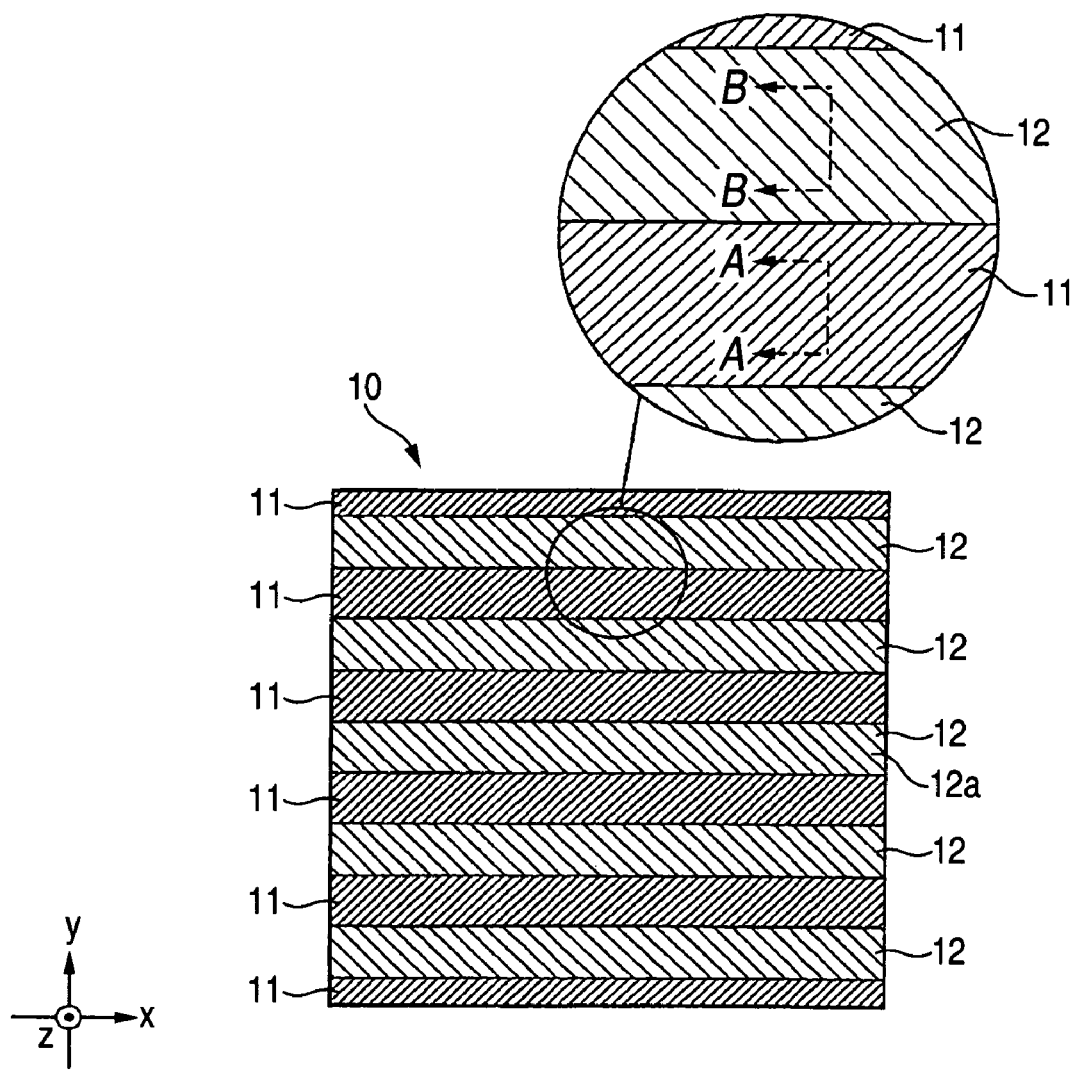
FIG. 1 is a plan view of a diffraction grating for plural wavelengths according to a first embodiment of the invention and a partially enlarged view of the diffraction grating.
Figure 3:
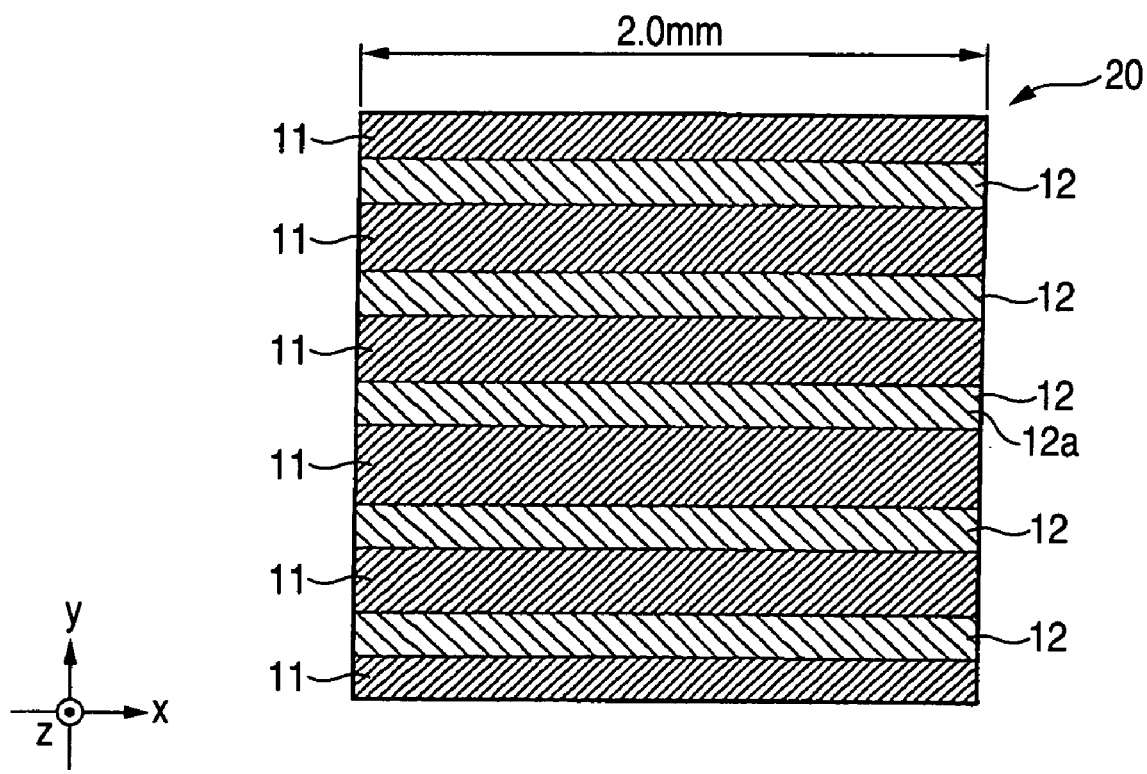
Figure 4A:
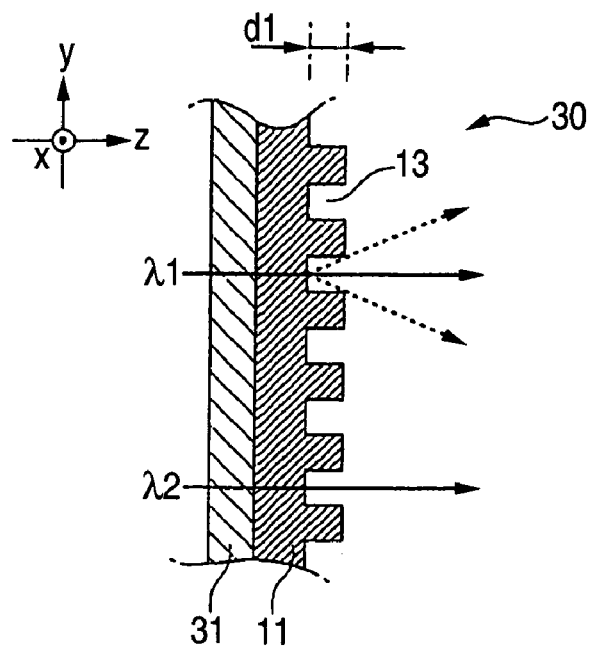
Figure 4B:
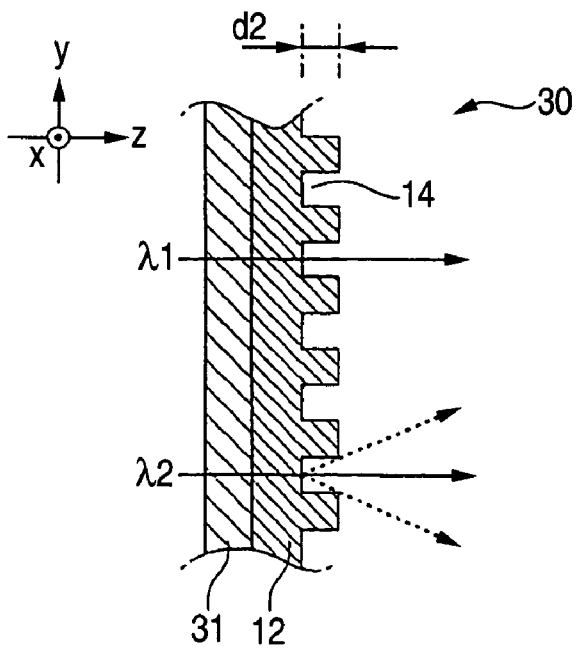
Figure 5:
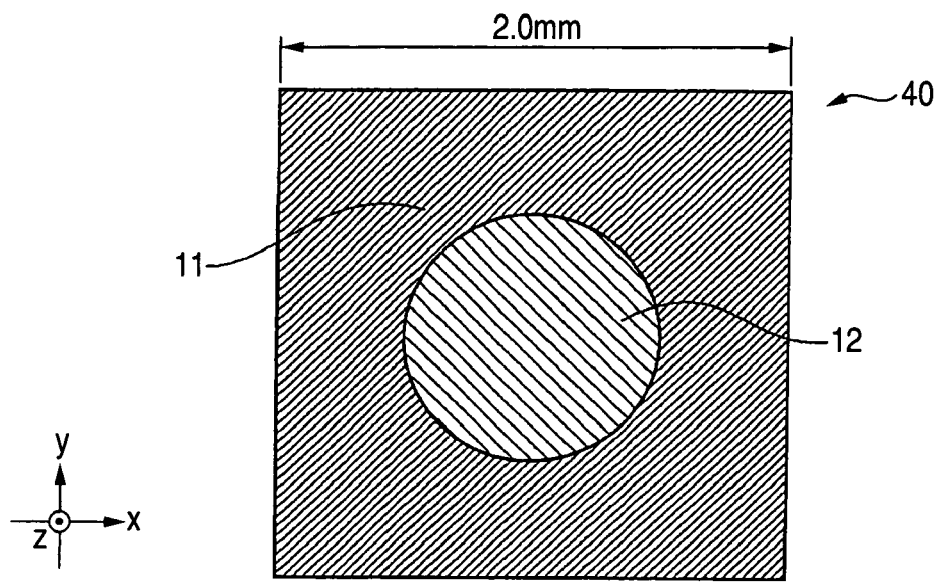
Figure 6:
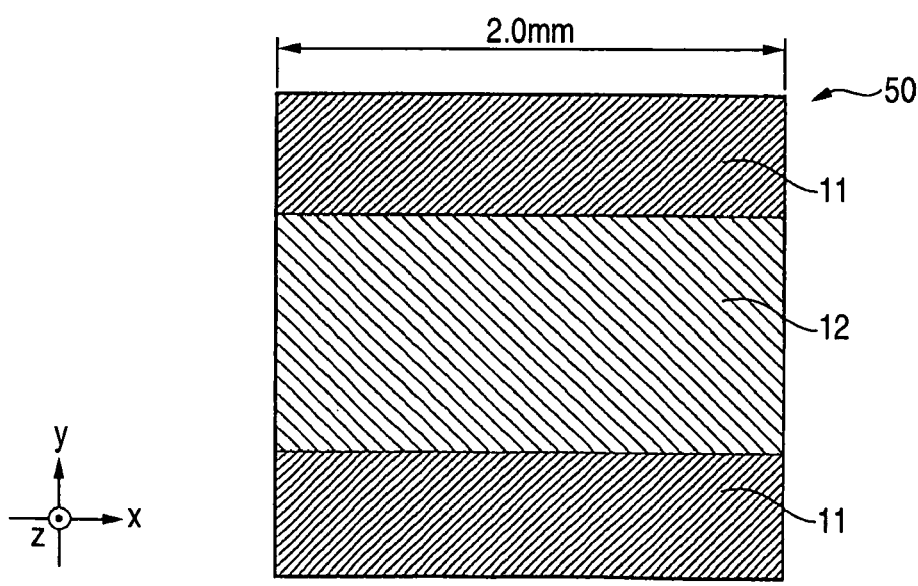
Figure 7:
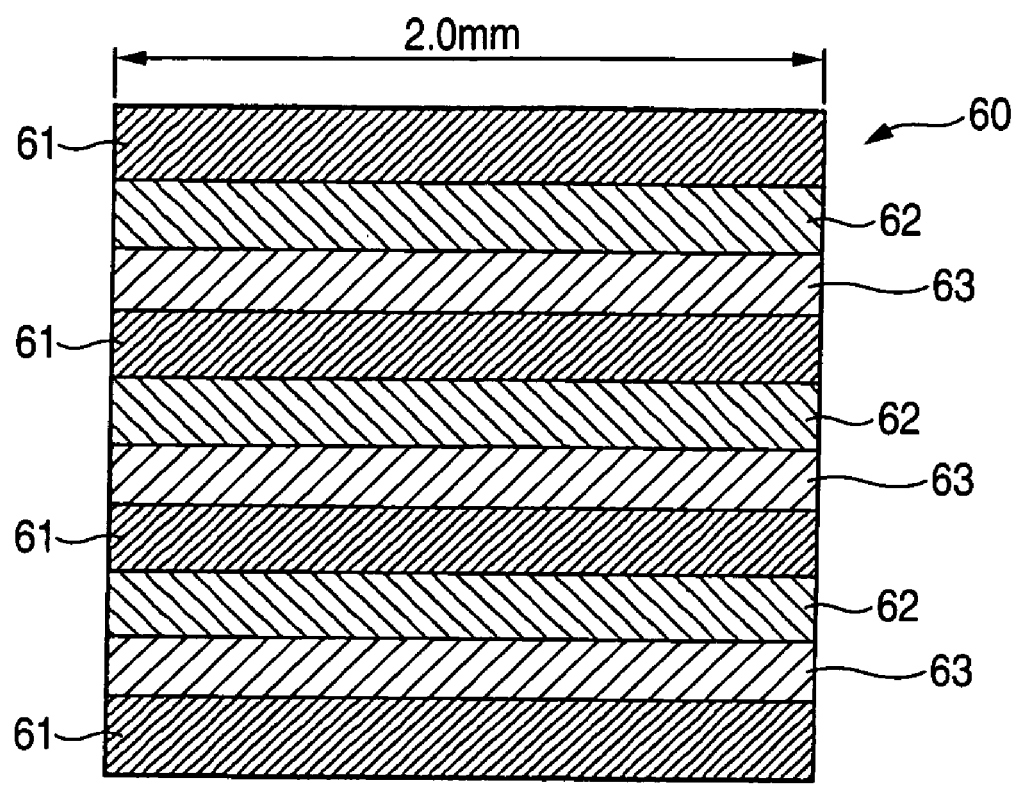
Figure 8A:
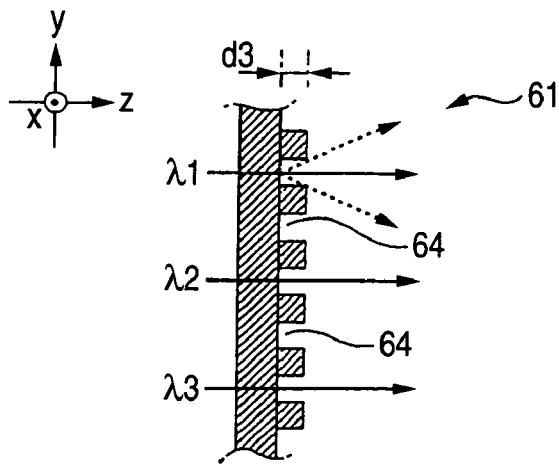
Figure 8B:
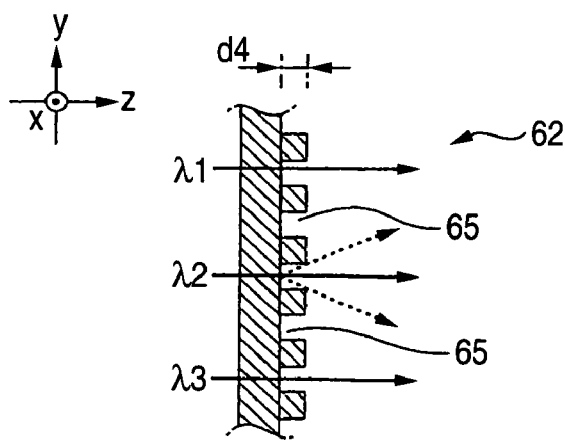
Figure 8C:
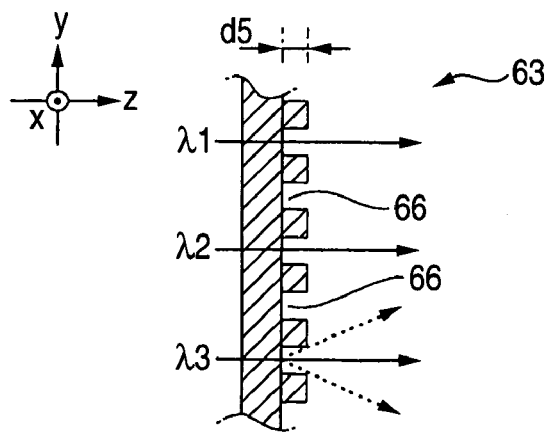
Figure 9:
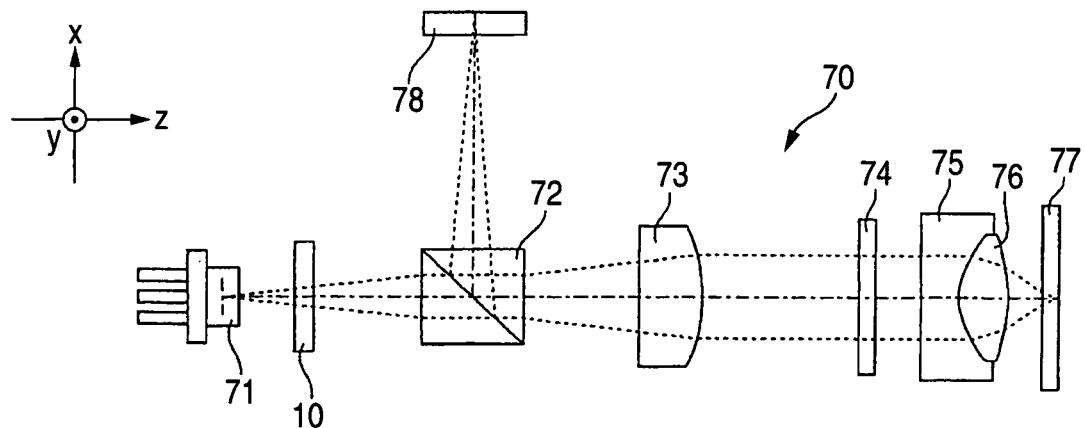
Figure 10:
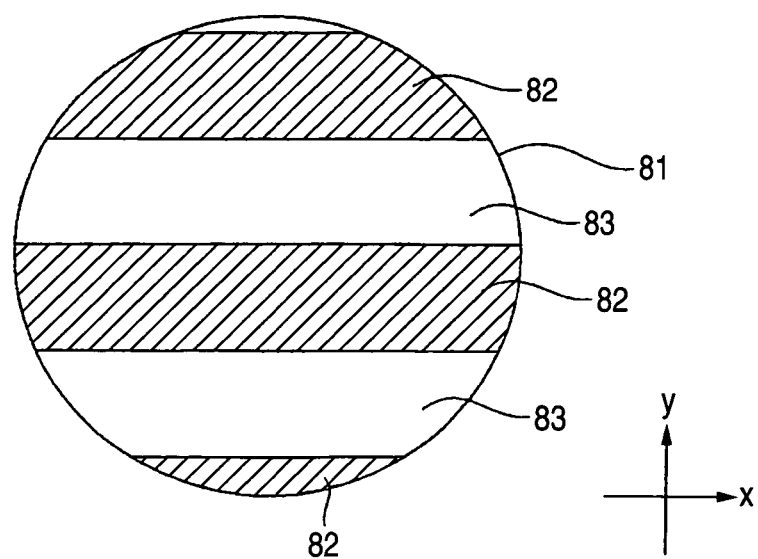
Figure 11:
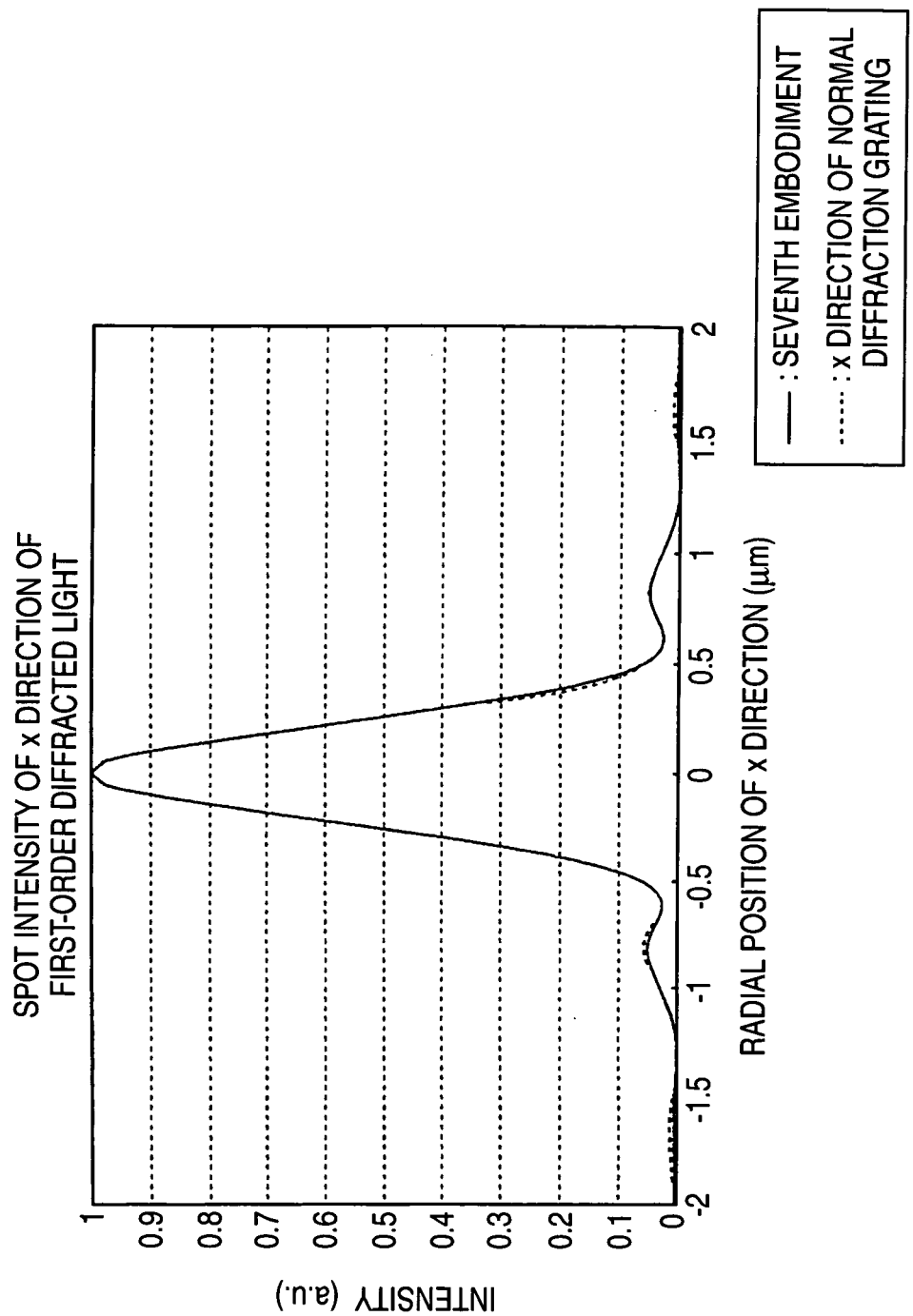
Figure 12:
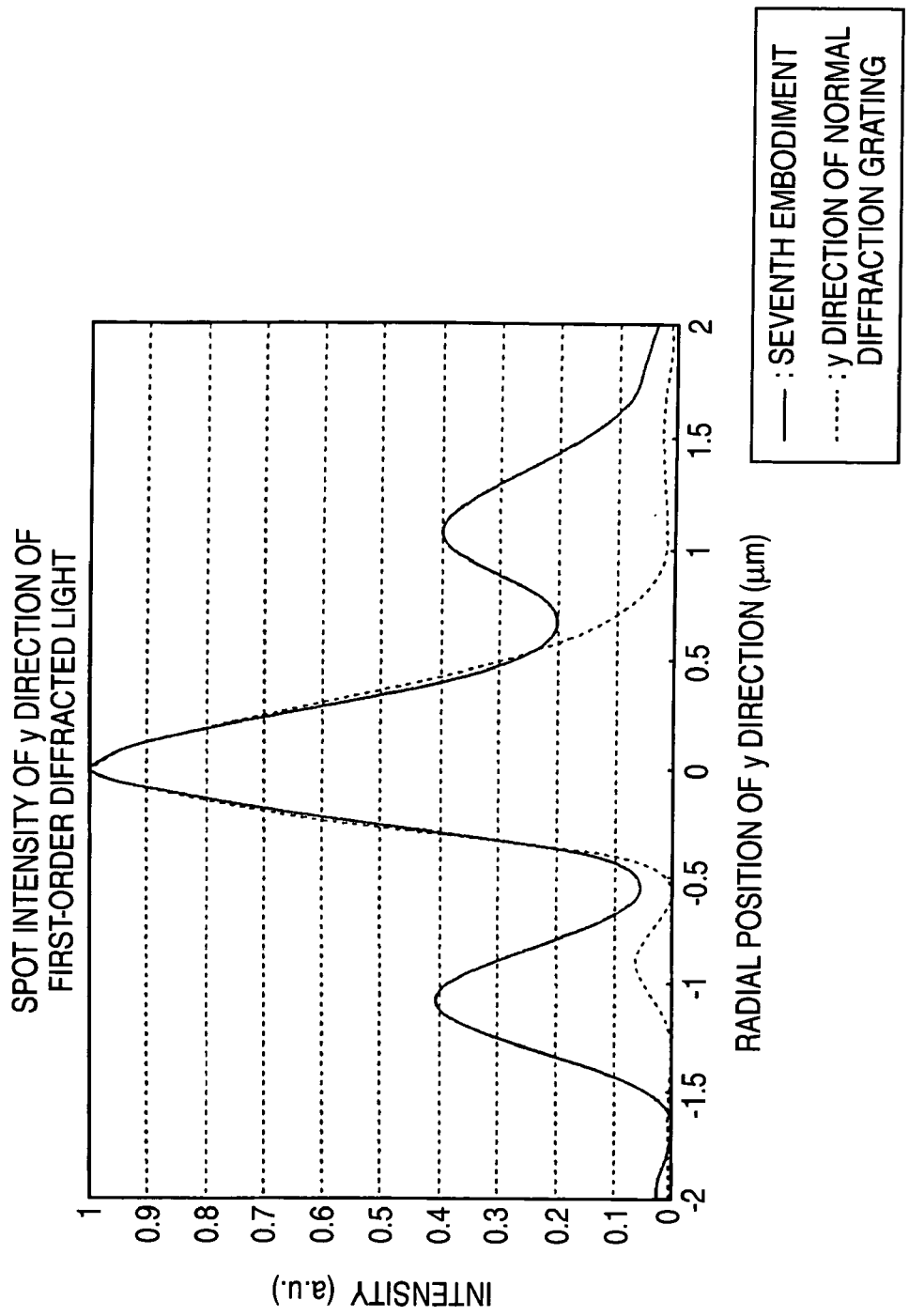
Figure 13:
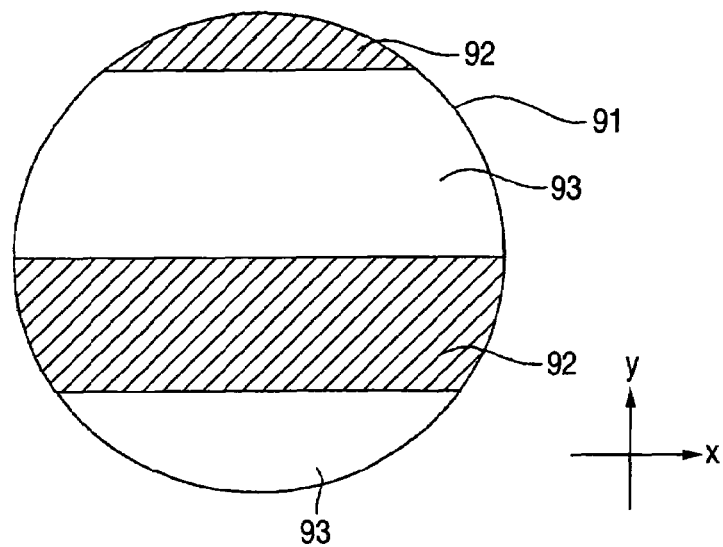
Figure 14:
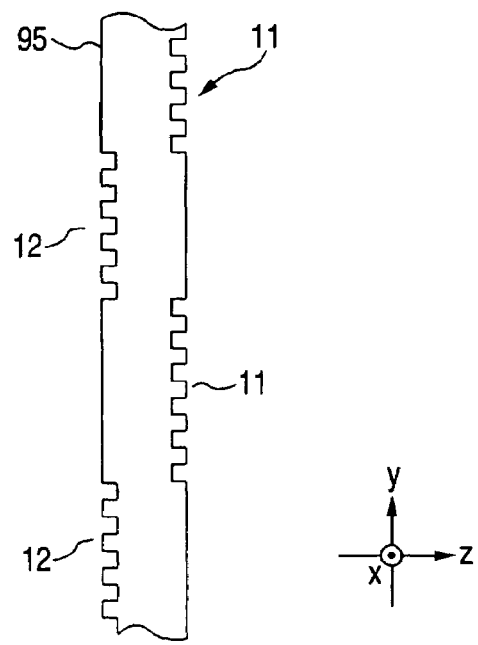

2B is a partially sectional view taken on line B-B shown in FIG. 1 of a second grating region;

FIG. 3 is a plan view of a diffraction grating for plural wavelengths according to a second embodiment of the invention;

FIGS. 4A and 4B are views showing a diffraction grating for plural wavelengths according to a third embodiment of the invention and is a view describing a relation between incident light and diffracted light, and FIG. 4A is a partially sectional view of a first grating region, and FIG. 4B is a partially sectional view of a second grating region;

FIG. 5 is a plan view of a diffraction grating for plural wavelengths according to a fourth embodiment of the invention;

FIG. 6 is a plan view of a diffraction grating for plural wavelengths according to a fifth embodiment of the invention;

FIG. 7 is a plan view of a diffraction grating for plural wavelengths according to a sixth embodiment of the invention;

FIGS. 8A to 8C are partially sectional views of the diffraction grating for plural wavelengths of FIG. 7 and is a view describing a relation between incident light and diffracted light, and FIG. 8A is a partially sectional view of a first grating region, and FIG. 8B is a partially sectional view of a second grating region, and FIG. 8C is a partially sectional view of a third grating region;

FIG. 9 is a schematic main configuration diagram of an optical pickup apparatus according to a seventh embodiment of the invention;

FIG. 10 is a schematic diagram of distribution of diffracted light of a first wavelength $\lambda 1$ of an aperture portion of an objective lens in the optical pickup apparatus shown in FIG. 9;

FIG. 11 is a sectional diagram in a direction of the x axis of a spot profile of − first-order diffracted light on an optical disk surface in the optical pickup apparatus shown in FIG. 9;

FIG. 12 is a sectional diagram in a direction of the y axis of a spot profile of − first-order diffracted light on an optical disk surface in the optical pickup apparatus shown in FIG. 9;

FIG. 13 is a schematic diagram of distribution of diffracted light of a second wavelength $\lambda 2$ of an aperture portion of an objective lens in the optical pickup apparatus shown in FIG. 9;

FIG. 14 is a partial side view of another modified example of an embodiment of the invention.

DETAILED DESCRIPTION OF THE PREFERRED EMBODIMENTS

A diffraction grating for plural wavelengths according to an embodiment of the invention, an optical pickup apparatus and an optical disk apparatus using its diffraction grating will be described below with reference to the drawings. Incidentally, in each the drawing, directions of each of the axes of x, y and z are shown, and this is used for understanding what relation each the drawing has to another drawing and also is used for describing an arrangement relation to an optical pickup apparatus described below.

First Embodiment

Figure 2A:
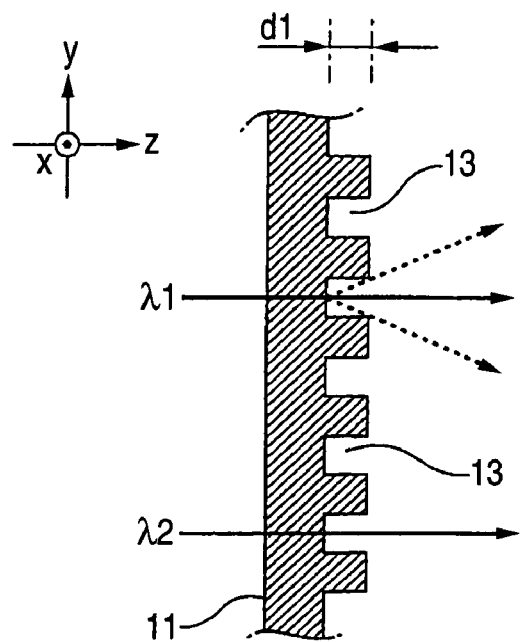
FIGS. 2A and 2B are partially sectional views of the diffraction grating for plural wavelengths shown in FIG. 1 and is a view describing a relation between incident light and diffracted light.
Figure 2B:
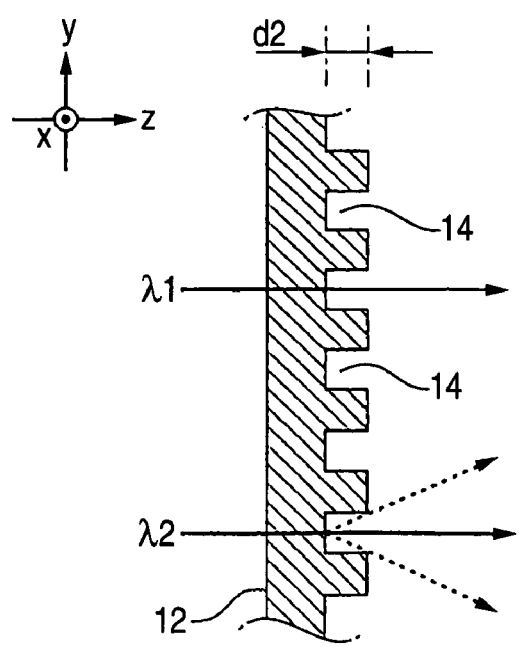

FIG. 1 is a plan view of a diffraction grating 10 for plural wavelengths according to a first embodiment of the invention and a partially enlarged view of the diffraction grating. FIGS. 2A and 2B are partially sectional views of the diffraction grating 10 for plural wavelengths of FIG. 1, and FIG. 2A is a partially sectional view taken on line A-A of a first grating region 11 of the diffraction grating 10 for plural wavelengths, and FIG. 2B is a partially sectional view taken on line B-B of a second grating region 12 of the diffraction grating 10 for plural wavelengths.

The diffraction grating 10 for plural wavelengths according to a first embodiment of the invention is designed for two wavelengths. For this reason, hereinafter the diffraction grating designed for two wavelengths is simply referred to as a diffraction grating for two wavelengths. The diffraction grating 10 for two wavelengths is made of an optically isotropic translucent substrate which light of a refractive index n1 passes through, and has a striped structure in which first grating regions 11 with band shape in which a length of a direction of the x axis is 2.0 mm and a width of a direction of the y axis is 200 μm and second grating regions 12 with band shape having a width of 200 μm long formed so as to have the same shape as that of the first grating region 11 are alternately arranged as shown in FIG. 1. Also, the positioning is performed so that the center of the second grating region 12a placed in the center is aligned in the center position of the whole diffraction grating 10 for two wavelengths. Incidentally, a first grating portion is formed by gathering one or more first grating regions 11 and a second grating portion is formed by gathering one or more second grating regions 12. In this FIG. 1, it is formed in square shape with a length of 1.0 mm and a width of 1.0 mm as a whole.

As shown in FIG. 2A, protrusions and depressions in which widths of a direction of the y axis are respectively equalized are periodically formed on one surface (surface of the emission side of light) of the first grating region 11, and a groove depth of a depression 13 used as its grating depth is set to d1. A relation among this groove depth d1, a refractive index n1, a wavelength $\lambda 1$ used as a first wavelength and a wavelength $\lambda 2$ used as a second wavelength of a wavelength different from the wavelength $\lambda 1$ is constructed so as to satisfy the following formulae.

$$2\pi \times (n1-1) \cdot d1/\lambda 1 \neq na \cdot 2\pi \qquad \text{formula 1}$$

$$2\pi \times (n1-1) \cdot d1/\lambda 2 = nb \cdot 2\pi \qquad \text{formula 2}$$

Here, na and nb are arbitrary natural numbers. Also, a phase difference by a refractive index difference between the wavelengths $\lambda 1$ and $\lambda 2$ in air is expressed by formulae 1 and 2.

Also, as shown in FIG. 2B, protrusions and depressions in which widths of a direction of the y axis are respectively equalized are periodically formed on one surface (surface of the emission side of light) of the second grating region 12, and a groove depth of a depression 14 used as its grating depth is set to d2. A relation among this groove depth d2, a refractive index n1, a wavelength $\lambda 1$ and a wavelength $\lambda 2$ is constructed so as to satisfy the following formulae.

$$2\pi \times (n1-1) \cdot d2/\lambda 2 \neq nc \cdot 2\pi \qquad \text{formula 3}$$

$$2\pi \times (n1-1) \cdot d2/\lambda 1 = nd \cdot 2\pi \qquad \text{formula 4}$$

Here, nc and nd are arbitrary natural numbers. Also, a phase difference by a refractive index difference between the wavelengths $\lambda 1$ and $\lambda 2$ in air is expressed by formulae 3 and 4.

According to scalar theory, efficiency of light diffracted in the case of being expressed by formulae 2 and 4 satisfies the following formulae 5 and 6. That is, the formulae are as follows.

$$\eta(0)=1 \qquad \text{formula 5}$$

$$\eta(\pm 1)=0 \qquad \text{formula 6}$$

Here, η(0) is zero-order light diffraction efficiency and η(±1) shows ± first-order light diffraction efficiency. That is, formulae 5 and 6 indicate that diffraction is not generated. Also, according to scalar theory, in the case of being expressed by formulae 1 and 3, diffraction is generated and η(0) becomes less than one and η(±1) becomes a value in excess of zero. Then, the efficiency of light diffracted (efficiency of zero-order light or ± first-order light) can be adjusted by adjusting a ratio between a pitch (length of a pair of a protrusion and a depression) of a diffraction grating and a width of the depression 13 or 14.

In this embodiment, quartz glass of a refractive index n1 is adopted as the translucent substrate, and protrusions and depressions of each of the grating regions 11, 12 are formed using a patterning technique and an etching technique. Incidentally, instead of using such techniques, protrusions and depressions (particularly, grooves forming depressions) may be formed by performing groove processing by utilizing a dicing saw using a hard cutting tool such as diamond. Further, it may be constructed so that a thick plate having protrusions and depressions is formed as a metal mold and plastic injection molding is performed using this metal mold. Incidentally, a diffraction grating may be formed by providing protrusions of a refractive index n1 on a translucent substrate with flat plate shape.

In accordance with the diffraction grating 10 for two wavelengths according to this first embodiment, when light of a wavelength λ1 enters this diffraction grating 10 for two wavelengths, in a portion of the first grating regions 11, the light diffracts according to an optical path difference in air by formula 1 and in a portion of the second grating regions 12, an optical path difference in air is a multiple of 2π by formula 4, so that the light does not diffract and transmits. On the other hand, when light of a wavelength λ2 enters the diffraction grating 10 for two wavelengths, an optical path difference in air is a multiple of 2π by formula 2, so that the light does not diffract and transmits and in a portion of the second grating regions 12, the light diffracts according to an optical path difference in air by formula 3.

Thus, in the diffraction grating 10 for two wavelengths, with respect to incidence of the light of the wavelength λ1 and the wavelength λ2, only diffracted light corresponding to each of the wavelengths is generated and stray light is not generated and a diffraction grating for two wavelengths without light quantity loss can be achieved. Also, each of the grating regions 11, 12 have band (long) shape in a direction of the x axis, so that a light beam of incident diffracted light of each the wavelength does not suffer aperture limits with respect to the direction of the x axis.

Second Embodiment

A plane state of a diffraction grating 20 for two wavelengths according to a second embodiment of the invention is shown in FIG. 3. The diffraction grating 20 for two wavelengths shown in FIG. 3 has the basically same configuration as that of the diffraction grating 10 for two wavelengths according to the first embodiment, and description will be made by attaching the same signs as those of the first embodiment to the same members and the same portions and also using the same words.

This diffraction grating 20 for two wavelengths is made of a translucent substrate of a refractive index n1 as in the previous diffraction grating 10 for two wavelengths, and has a striped structure in which first grating regions 11 with band shape having 2.0 mm in a direction of the x axis and a width of 250 μm and second grating regions 12 with band shape having a width of 150 μm are alternately arranged as shown in FIG. 3. Also, each of the regions 11, 12 are positioned so that the center of the second grating region 12a placed in the center is aligned in the center of the whole diffraction grating 20 for two wavelengths. Each grating structure of the first grating regions 11 and the second grating regions 12 is similar to that of the diffraction grating 10 for two wavelengths according to the first embodiment, and relations of formula 1 to formula 4 hold.

Therefore, in a manner similar to the case of the first embodiment, in the diffraction grating 20 for two wavelengths of this second embodiment, with respect to incidence of light of a wavelength λ1 and a wavelength λ2, only diffracted light corresponding to each of the wavelengths is generated and stray light is not generated and a diffraction grating for two wavelengths without light quantity loss can be achieved. Also, a light beam of incident diffracted light of each the wavelength does not suffer aperture limits with respect to a direction of the x axis.

Further, the quantity of diffracted light can be adjusted by adjusting a ratio of widths of the first grating regions 11 and the second grating regions 12 of the diffraction grating 20 for two wavelengths. For example, in the case of being constructed so that incident light with a short wavelength of 650 nm for DVD is diffracted by the first grating regions 11 and incident light with a long wavelength of 790 nm for CD is diffracted by the second grating regions 12, unnecessary diffracted light can be decreased.

Third Embodiment

A diffraction grating 30 for two wavelengths according to a third embodiment of the invention is shown in FIGS. 4(A) and 4(B). Both of FIGS. 4(A) and 4(B) are partially sectional views of the diffraction grating 30 for two wavelengths. A basic configuration of this diffraction grating 30 for two wavelengths is similar to that of the first or second embodiment, and is different in that a phase plate 31 is provided in the incident side of light.

In this diffraction grating 30 for two wavelengths, the phase plate 31 is applied on a translucent substrate with a refractive index n1 of the diffraction grating 10 for two wavelengths of the first embodiment or the diffraction grating 20 for two wavelengths of the second embodiment so as to cover the whole surface. FIG. 4A shows a cross section of a first grating region 11 and FIG. 4B shows a cross section of a second grating region 12.

The phase plate 31 is made of an organic thin film such as a polycarbonate film, and is obtained by forming a birefringent film with an aligned optical axis in a stretch direction. By this, a phase difference is generated and a polarization state of at least one of two wavelengths λ1, λ2 is changed. The change in the polarization state means that linearly polarized light is changed to circularly polarized light and vice versa. A wave plate such as a half-wave plate or a quarter-wave plate is well known as the phase plate. Incidentally, the phase plate 31 may be films other than the organic thin film or be a substrate made of birefringent resin or glass using quartz etc. rather than a film.

Since the phase plate 31 has only to be means for shifting a phase, a random phase plate for randomly placing a coating for providing a phase delay by a half wavelength or a chino-form phase plate for providing desired phase distribution may be adopted rather than the phase plate having birefringence. Use of such a phase plate in an optical pickup apparatus can result in high resolution.

The phase plate 31 as described above is applied to the diffraction gratings 10, 20 for two wavelengths or is formed of a film by vapor deposition etc. and thereby, the number of parts of an optical pickup apparatus etc. together using the diffraction grating and the phase plate can be decreased and contribution to miniaturization of the apparatus is made. Incidentally, integration of the phase plate 31 into the diffraction grating can also be applied to diffraction gratings of other embodiments described below.

Fourth Embodiment

A diffraction grating 40 for two wavelengths according to a fourth embodiment of the invention is shown in FIG. 5. FIG. 5 is a plan view of this diffraction grating 40 for two wavelengths. This diffraction grating 40 for two wavelengths is made of a translucent substrate which light of a refractive index n1 passes through in a manner similar to the diffraction grating 10 for two wavelengths of the first embodiment, and has a structure in which a second grating region 12 with circular plate shape is placed in the center and a first grating region 11 with ring shape is placed around the second grating region as shown in FIG. 5.

This diffraction grating 40 for two wavelengths is formed in square shape with a length of 2.0 mm and a width of 2.0 mm as a whole. Then, positioning is performed so that the center of the second grating region 12 is aligned in the center of the diffraction grating 40 for two wavelengths. Grating structures of the first grating region 11 and the second grating region 12 are similar to those of the diffraction grating 10 for two wavelengths according to the first embodiment, and relations of formula 1 to formula 4 hold. Incidentally, the first grating region 11 forms a first grating portion and the second grating region 12 forms a second grating portion.

In a manner similar to the case of the first or second embodiment, in the diffraction grating 40 for two wavelengths by this configuration, with respect to incidence of light of a wavelength $\lambda 1$ and a wavelength $\lambda 2$, only diffracted light corresponding to each of the wavelengths is generated and stray light is not generated and a diffraction grating for two wavelengths without light quantity loss can be achieved.

Also, in the case of applying this diffraction grating 40 for two wavelengths to an optical pickup apparatus, when there is a difference between a first wavelength $\lambda 1$ and a second wavelength $\lambda 2$ in apertures of incidence on an objective lens in the optical pickup apparatus and the aperture of the wavelength $\lambda 1$ is larger, a size of its circle of the second grating region 12 is adapted to the incidence aperture of the wavelength $\lambda 2$. Then, by being constructed so that light of the second wavelength $\lambda 2$ is diffracted by the second grating region 12 and light of the first wavelength $\lambda 1$ is diffracted by the first grating region 11, with respect to a light beam of the wavelength $\lambda 1$, only the center is cut out and an aperture of the light beam of the wavelength $\lambda 1$ is not limited. Also, since the second grating region 12 has a large circle, with respect to the wavelength $\lambda 2$, an aperture of a direction of the x axis is not limited and loss of light beam shape of diffracted light is smaller and a diffraction grating for two wavelengths without light quantity loss can be achieved.

Fifth Embodiment

A diffraction grating 50 for two wavelengths according to a fifth embodiment of the invention is shown in FIG. 6. FIG. 6 is a plan view of this diffraction grating 50 for two wavelengths. This diffraction grating 50 for two wavelengths is a modified example of the diffraction grating 20 for two wavelengths according to the second embodiment. A width of a direction of the y axis of a second grating region 12 is set to 1.0 mm, and first grating regions 11 in which a length is set to 2.0 mm and a width of the direction of the y axis is set to 0.5 mm, respectively, are placed in both sides of the direction of the y axis. Each grating structure of the first grating regions 11 and the second grating region 12 is similar to that of the diffraction grating 10, 20 for two wavelengths according to the first or second embodiment, and relations of formula 1 to formula 4 hold.

Therefore, in a manner similar to the case of the first or second embodiment, in the diffraction grating 50 for two wavelengths by this configuration, with respect to incidence of light of a wavelength $\lambda 1$ and a wavelength $\lambda 2$, only diffracted light corresponding to each of the wavelengths is generated and stray light is not generated and a diffraction grating for two wavelengths without light quantity loss can be achieved.

Also, in the case of applying this diffraction grating 50 for two wavelengths to an optical pickup apparatus, when there is a difference between a first wavelength $\lambda 1$ and a second wavelength $\lambda 2$ in apertures of incidence on an objective lens in the optical pickup apparatus and the aperture of the wavelength $\lambda 1$ is larger, its width of the second grating region 12 of the diffraction grating 50 for two wavelengths is adapted to the incidence aperture of the wavelength $\lambda 2$ with the smaller aperture. Then, by being constructed so that light of the second wavelength $\lambda 2$ is diffracted by the second grating region 12 and light of the first wavelength $\lambda 1$ is diffracted by the first grating regions 11, with respect to a light beam of the wavelength $\lambda 1$, only the center is cut out and an aperture of the light beam of the wavelength $\lambda 1$ is not limited. Also, with respect to the wavelength $\lambda 2$, an aperture of a direction of the x axis is not limited and diffracted light does not become a strip-shaped repeat state, so that quality of a spot of the diffracted light does not deteriorate and a diffraction grating for two wavelengths without light quantity loss can be achieved.

Sixth Embodiment

A diffraction grating 60 for plural wavelengths according to a sixth embodiment of the invention will be described based on FIGS. 7 and 8. Incidentally, this diffraction grating 60 for plural wavelengths is designed for three wavelengths, but a basic configuration is the same as that of the diffraction grating 10, 20 for two wavelengths, and description will be made by using the same signs and words in the same members and the same portions. Also, this diffraction grating 60 for plural wavelengths will be described below as a diffraction grating 60 for three wavelengths.

This diffraction grating 60 for three wavelengths is made of a translucent substrate which light of a refractive index n1 passes through, and has a striped structure in which first grating regions 61 with band shape long formed in a direction of the x axis, second grating regions 62 with band shape having the same shape as the first grating regions 61 and third grating regions 63 with band shape having the same shape as the first grating regions 61 are sequentially arranged as shown in FIG. 7. Incidentally, widths of a direction of the y axis of each of the grating regions 61, 62, 63 are equalized, but only two widths of the three widths may be equalized and the other width may be set to a different width, or all of the three widths may be set to different widths.

FIG. 8A is a partially sectional view of the first grating region 61 of the diffraction grating 60 for three wavelengths. Protrusions and depressions with equal widths of a direction of the y axis are periodically formed on one surface of the first grating region 61, and a groove depth used as its grating depth is set to d3. Then, a relation among the grating depth d3 used as the groove depth of a depression 64, a refractive index n1, a wavelength λ1, a wavelength λ2 and a wavelength λ3 is constructed so as to satisfy the following formulae.

$$2\pi \times (n1-1) \cdot d3/\lambda 1 \neq ne \cdot 2\pi \qquad \text{formula 7}$$

$$2\pi \times (n1-1) \cdot d3/\lambda 2 = nf \cdot 2\pi \qquad \text{formula 8}$$

$$2\pi \times (n1-1) \cdot d3/\lambda 3 = ng \cdot 2\pi \qquad \text{formula 9}$$

Here, ne, nf and ng are arbitrary natural numbers.

A partially sectional state of the second grating region 62 of this diffraction grating 60 for three wavelengths is shown in FIG. 8B. Protrusions and depressions with respectively equal widths of a direction of the y axis are periodically formed on one surface (right in FIGS. 8A to 8C) of the second grating region 62, and a groove depth (depth of a depression 65) used as its grating depth is set to d4. A relation among this grating depth d4, a refractive index n1, a wavelength λ1, a wavelength λ2 and a wavelength λ3 is constructed so as to satisfy the following formulae.

$$2\pi \times (n1-1) \cdot d4/\lambda 1 = nh \cdot 2\pi \qquad \text{formula 10}$$

$$2\pi \times (n1-1) \cdot d4/\lambda 2 \neq ni \cdot 2\pi \qquad \text{formula 11}$$

$$2\pi \times (n1-1) \cdot d4/\lambda 3 = nj \cdot 2\pi \qquad \text{formula 12}$$

Here, nh, ni and nj are arbitrary natural numbers.

A partially sectional state of the third grating region 63 of this diffraction grating 60 for three wavelengths is shown in FIG. 8C. Protrusions and depressions with respectively equal widths of a direction of the y axis are periodically formed on one surface (the same surface as a surface on which the protrusions and depressions of the other regions 61, 62 are formed) of the third grating region 63, and a grating depth (groove depth) used as its depression 66 is set to d5. Also in this third grating region 63, as shown in FIG. 8C, a relation among the grating depth d5, a refractive index n1, a wavelength λ1, a wavelength λ2 and a wavelength λ3 is constructed so as to satisfy the following formulae.

$$2\pi \times (n1-1) \cdot d5/\lambda 1 = nk \cdot 2\pi \qquad \text{formula 13}$$

$$2\pi \times (n1-1) \cdot d5/\lambda 2 = nl \cdot 2\pi \qquad \text{formula 14}$$

$$2\pi \times (n1-1) \cdot d5/\lambda 3 \neq nm \cdot 2\pi \qquad \text{formula 15}$$

Here, nk, nl and nm are arbitrary natural numbers.

According to this diffraction grating 60 for three wavelengths, when light of a wavelength λ1 which is a first wavelength enters this diffraction grating 60 for three wavelengths, in a portion of the first grating regions 61, the light diffracts according to an optical path difference in air by formula 7 and in portions of the second grating regions 62 and the third grating regions 63, an optical path difference in air is a multiple of 2π by formula 8 and formula 9, so that the light does not diffract and transmits. Similarly, with respect to a wavelength λ2 which is a second wavelength or a wavelength λ3 which is a third wavelength, action as shown by arrows of FIGS. 8(A), 8(B), 8(C) is generated by each the region.

As a result of this, in the diffraction grating 60 for three wavelengths, with respect to incidence of light of the wavelength λ1, the wavelength λ2 and the wavelength λ3, only diffracted light corresponding to each of the wavelengths is generated and stray light is not generated and a diffraction grating for three wavelengths without light quantity loss can be achieved. Also, each of the grating regions 61, 62, 63 are long formed respectively in a direction of the x axis, so that a light beam of incident diffracted light of each the wavelength does not suffer aperture limits with respect to the direction of the x axis.

Seventh Embodiment

An optical pickup apparatus according to an embodiment of the invention will be described as a seventh embodiment with reference to FIGS. 9 to 13. In this optical pickup apparatus 70, any one of the diffraction gratings 10, 20, 30 for two wavelengths is placed in the optical system. Incidentally, the diffraction grating 40 or 50 for two wavelengths may be placed in this optical pickup apparatus 70, or the diffraction grating 60 for three wavelengths may be placed in an apparatus in which the optical pickup apparatus 70 is changed to an apparatus for three wavelengths.

FIG. 9 is a schematic main configuration diagram of an optical system of the optical pickup apparatus 70. The optical pickup apparatus 70 has a two-wavelength semiconductor laser 71 used as a light source portion, a diffraction grating 10 for two wavelengths, a polarization beam splitter 72, a collimator lens 73, a quarter-wave plate 74, an objective lens 76 mounted in an actuator 75, and a photodetector 78 for receiving a light beam for detection reflected from an optical disk used as an optical record medium and outputting a current. Here, the two-wavelength semiconductor laser 71 is a laser in which a first semiconductor laser light source for emitting light of a first wavelength and a second semiconductor laser light source for emitting light of a second wavelength are provided inside the same package. Incidentally, as a semiconductor laser for emitting light of two wavelengths, for example, a monolithic semiconductor laser for two wavelengths in which a semiconductor laser with a wavelength band of 790 nm and a semiconductor laser with a wavelength band of 650 nm are formed inside one chip or a semiconductor laser for two wavelengths made of plural chips in which laser chips of each wavelength band are placed so that a distance between light emission points is a distance of about 100 to 300 μm may be adopted.

In this FIG. 9, a first wavelength λ1 of the two-wavelength semiconductor laser 71 is set to a wavelength band of 650 nm for DVD, and a second wavelength λ2 is set to a wavelength band of 790 nm for CD. A base material thickness of an optical disk 77 compatible with the wavelength λ1 is 0.6 mm, and a base material thickness of an optical disk 77 compatible with the wavelength λ2 is 1.2 mm. Also, the objective lens 76 is the objective lens 76 compatible with the wavelength λ1 and the wavelength λ2, and has a structure in which an aperture is limited so that an NA value which is a numerical aperture is 0.65 for the wavelength λ1 and an NA value is 0.45 for the wavelength λ2, respectively. Also, a focal length of the objective lens 76 is 3 mm, and a focal length of the collimator lens 73 is 18 mm.

Light of the wavelength λ1 emitted from the two-wavelength semiconductor laser 71 passes through the diffraction grating 10 for two wavelengths. At this time, a part of light incident on the diffraction grating 10 for two wavelengths diffracts as ± first-order light. Both of the zero-order and ± first-order light pass through the polarization beam splitter 72 and then are changed to collimated light by the collimator lens 73 and enter the quarter-wave plate 74. Light of linearly polarized light is converted into circularly polarized light by the quarter-wave plate 74 and is collected to the optical disk 77 every order of each diffraction by the objective lens 76 mounted in the actuator 75.

Light reflected by the optical disk 77 passes the objective lens 76 and is converted into light of linearly polarized light perpendicular to a polarization plane of semiconductor laser emitted light by the quarter-wave plate 74 and enters the polarization beam splitter 72. A polarization plane of light entering the polarization beam splitter 72 is perpendicular to an outgoing path, so that the light is reflected by the polarization beam splitter 72 and enters a light receiving plane of the photodetector 78 every each order.

When − first-order light diffracted by the diffraction grating 10 for two wavelengths enters an aperture of the objective lens 76, the light has an angular component by diffraction, so that the light enters the outside of an optical axis and its image is formed as shown in FIG. 10. An aperture 81 in FIG. 10 shows an aperture of the objective lens 76 in a wavelength $\lambda 1$, and the NA value is 0.65 and the focal length of the objective lens 76 is 3 mm, so that a radius of the aperture 81 becomes 1.95 mm by the following expression.

$$0.65 \times 3 = 1.95$$

Also, a region shown by numeral 82 shows a region of a light beam diffracted by a first grating region 11 of the diffraction grating 10 for two wavelengths, and a region shown by numeral 83 shows a region in which a light beam is not present.

In FIG. 10, in a spot generated by this light beam, the light beam forms a striped pattern in a direction of the y axis, so that spot quality deteriorates, but the aperture is not limited in a direction of the x axis, so that spot quality is little damaged. Therefore, when a track direction (radial direction of the optical disk 77) in which tracks of the optical disk 77 are placed is the direction of the x axis, influence of deterioration of the spot quality in the direction of the y axis is not received and a tracking signal component of diffracted light in a light receiving plane does not deteriorate.

Results calculated actually are shown in FIGS. 11 and 12. Here, laser intensity distribution is made uniform in order to simplify the calculation. In a graph of FIG. 11, a curve of a solid line shows spot intensity distribution in a direction of the x axis of − first-order diffracted light on the optical disk 77 in the seventh embodiment. Also, for comparison, a curve of a broken line shows spot intensity distribution in a direction of the x axis of − first-order diffracted light on a surface of the optical disk 77 in the case of entrance of a wavelength $\lambda 1$ using a conventional diffraction grating for one wavelength having only a first grating region 11 instead of the diffraction grating 10 for two wavelengths. As shown in FIG. 11, it is found that deterioration of spot quality does not occur at all in the direction of the x axis.

In a graph of FIG. 12, a curve of a solid line shows spot intensity distribution in a direction of the y axis of − first-order diffracted light on the optical disk 77 in the seventh embodiment. Also, for comparison, a curve of a broken line shows spot intensity distribution in a direction of the y axis of − first-order diffracted light on the optical disk 77 in the case of entrance of a wavelength $\lambda 1$ using a diffraction grating for one wavelength having only a first grating region 11 in a manner similar to FIG. 11. It is found that intensity of − first-order diffracted light of a spot becomes larger than normal intensity and the spot deteriorates in the direction of the y axis. However, as described above, by locating a direction of the x axis so as to become a radial direction which is a direction in which tracks of the optical disk 77 are placed, radial signal quality is not influenced.

Similarly, light of the wavelength $\lambda 2$ emitted from the two-wavelength semiconductor laser 71 passes through the diffraction grating 10 for two wavelengths. At this time, a part of light incident on the diffraction grating 10 for two wavelengths diffracts as ± first-order light. Both of the zero-order and ± first-order light are reflected by the polarization beam splitter 72 and then are changed to collimated light by the collimator lens 73 and enter the quarter-wave plate 74. Light of linearly polarized light is converted into circularly polarized light by the quarter-wave plate 74 and then is collected on a surface of the optical disk 77 every order of each diffraction by the objective lens 76 mounted in the actuator 75.

Light reflected by the optical disk 77 passes the objective lens 76 and is converted into light of linearly polarized light perpendicular to a polarization plane of semiconductor laser reflected light by the quarter-wave plate 74 and enters the polarization beam splitter 72. A polarization plane of light entering the polarization beam splitter 72 is perpendicular to an outgoing path, so that the light passes through the polarization beam splitter 72 and enters a light receiving plane of the photodetector 78 every each order. When − first-order light diffracted by the diffraction grating 10 for two wavelengths enters an aperture of the objective lens 76, the light has an angular component by diffraction, so that the light enters the outside of an optical axis and its image is formed as shown in FIG. 13.

An aperture 91 in FIG. 13 shows an aperture of the objective lens 76 in a second wavelength $\lambda 2$, and the NA value is 0.45 and the focal length of the objective lens 76 is 3 mm, so that a radius of the aperture 91 becomes 1.35 mm by the following expression.

$$0.45 \times 3 = 1.35$$

Also, a region shown by numeral 92 shows a region of a light beam diffracted by a second grating region 12 of the diffraction grating 10 for two wavelengths, and a region shown by numeral 93 shows a region in which a light beam is not present.

In FIG. 13 in a manner similar to FIG. 10, in a spot generated by this diffracted light beam, the light beam forms a striped pattern in a direction of the y axis, so that spot quality deteriorates, but the aperture is not limited in a direction of the x axis, so that spot quality is little damaged. Therefore, when a radial direction which is a direction in which tracks of the optical disk 77 are placed is the direction of the x axis, influence of deterioration of the spot quality in the direction of the y axis is not received and a tracking signal component of diffracted light in a light receiving plane does not deteriorate.

A phenomenon similar to that of the −first-order diffracted light described above also arises in + first-order diffracted light. On the other hand, experiment proves that a spot of quality, shape nearly similar to the conventional art can be obtained in zero-order diffracted light at the time of diffraction.

Effect of a sub-beam spot described above, that is, effect capable of being constructed so that half-width of a radial direction of the sub-beam spot becomes nearly equal to conventional half-width by placing a direction of the x axis in a radial direction of the optical disk 77 can be obtained similarly in the case of similarly placing the diffraction gratings 20, 30, 40, 50 for two wavelengths instead of the diffraction grating 10 for two wavelengths. Also, in the case of placing the diffraction grating 60 for three wavelengths, similar effect can be obtained with respect to each the wavelength. As a result of this, accuracy of a beam spot of the radial direction of the optical disk 77 necessary as a tracking signal is maintained at accuracy similar to the conventional art.

Also, for the diffraction gratings 10, 20, 30, 40, 50, 60 for plural wavelengths in each the embodiment described above, protrusions and depressions forming a grating structure are provided on a surface of the emission side of light, so that a coating incapable of being applied in the case of providing a grating structure on both surfaces, that is, an AR (anti-reflection) coating for increasing transmittance can be applied to a surface of the incident side of light and the transmittance of light can be increased and intensity of a light beam can be increased. Also, as compared with the case of providing the grating structure on both surfaces, variations in temperature do not suffer double influences and the variations in temperature also decrease. Further, in the case of molding the diffraction grating by a metal mold, a metal mold for diffraction grating could be prepared by only one surface and there are advantages in manufacturing efficiency and manufacturing cost.

The optical pickup apparatus 70 shown in the seventh embodiment is incorporated into an optical disk apparatus for both CD and DVD and is used. In this case, the optical pickup apparatus 70 receives an output from a slide feed mechanism including a feed motor etc. and reciprocates in a radial direction of the optical disk 77. Also, a reproduction circuit for generating and outputting a reproduction signal based on a current obtained by the photodetector 78 including a photodiode etc. is placed in the optical disk apparatus. Also, in the case of an optical disk apparatus capable of using a recordable optical disk 77, a signal recording circuit is further placed.

Also, in the seventh embodiment described above, the center of the whole diffraction grating 10 for two wavelengths is used for CD diffraction. That is, the second grating region 12a placed in the center of the second grating regions 12 is placed in the center of the diffraction grating 10 for two wavelengths and light of a second wavelength $\lambda 2$ of 790 nm used as a large wavelength is diffracted. As a result of this, first-order diffracted light for the wavelength $\lambda 2$ which is a wavelength in which positions of ± first-order diffracted light are larger distant from a position of zero-order light can be obtained as light with sufficient intensity. Also, in the case of the diffraction grating 20 for two wavelengths, the second grating region 12 is placed in the center of the diffraction grating 20 for two wavelengths, so that when 790 nm is adopted as a second wavelength and a wavelength of 650 nm is adopted as a first wavelength, similar effect can be obtained and also the first grating regions 11 are increased, so that unnecessary diffracted light can be decreased.

Each the embodiment described above is examples of preferred embodiments of the invention, but various modifications can be made without departing from the subject matter of the invention. For example, each width of a direction of the y axis of a first grating region 11 and a second grating region 12 may be shortened. For example, for the diffraction grating 10 for two wavelengths, each the width maybe shortened to ½ (100 μm) or may be further shortened to 70 μm. Also, for the diffraction grating 20 for two wavelengths, the first grating region 11 may be set to 200 μm rather than 250 μm and the second grating region 12 may be set to 100 μm rather than 150 μm or may be set to other values. By shortening the width of the direction of the y axis of each of the grating regions 11, 12 in this manner, influence on deviation of each of the grating regions 11, 12 can be reduced. Incidentally, in the sense that a spacing between diffracted light of unnecessary spots is narrowed and a decrease in transmittance in molding of a grating structure is prevented, this width of the direction of the y axis could be set to 30 μm or more, preferably 50 μm or more, further preferably 100 μm or more.

Also, in the seventh embodiment described above, an example in which the diffraction grating for plural wavelengths is inserted into a converging optical system has been shown, but the diffraction grating for plural wavelengths of the invention may be inserted into a light detection optical system for receiving light reflected by the optical disk 77 in the photodetector 78. Also, as an optical system of the optical pickup apparatus 70, various modifications can be made, for example, a half mirror is used instead of the polarization beam splitter 72 or a quarter-wave plate is not provided. Also, in the seventh embodiment described above, the diffraction grating for plural wavelengths has been placed between the objective lens 76 and a light source portion of a converging optical system so that a longitudinal direction of each of the grating regions 11, 12 is aligned with a radial direction of the optical disk 77, but in this relation, the optical path maybe rotated 90° or may be inverted 180° so as to be symmetric with respect to a mirror plane in the converging optical system, so that it is actually preferable to place the diffraction grating for plural wavelengths so that a longitudinal direction of each of the grating regions 11, 12 is aligned with a radial direction of the optical disk 77 in an aperture portion of the objective lens 76.

Also, as shown in FIG. 14, it may be constructed so that first grating regions 11 and second grating regions 12 are placed on both surfaces of a diffraction grating 95 for plural wavelengths so as not to overlap with a direction of the optical axis. In this diffraction grating 95 for plural wavelengths of FIG. 14, the second grating regions 12 are spaced on one surface in a direction of the y axis and the first grating regions 11 are spaced on the other surface in the direction of the y axis. In addition, both of the grating regions 11, 12 are placed so as not to overlap with a direction of the z axis which is the direction of the optical axis. Also, it may be constructed so that a direction of each grating is equalized to that of each the embodiment and a longitudinal direction of each of the grating regions 11, 12 is aligned with a direction of the y axis. In this case, an aperture of the direction of the y axis is not limited.

Also, in the embodiment described above, an example of using the diffraction grating for plural wavelengths in the optical pickup apparatus has been shown, but the diffraction grating for plural wavelengths can also be applied to a spectroscope, a spectral analyzer, a medical device of reagents or blood analysis, etc., an optical fiber diffraction grating, an X-ray device, etc. Also, it can be used as a diffraction grating for a monochromator together having a function of a collimator lens. Also, as an optical disk apparatus, an MO apparatus or an MD apparatus other than an optical disk apparatus for both CD and DVD can be adopted properly. Also, the diffraction grating for plural wavelengths or the optical pickup apparatus of the invention can be applied to a light passage method in which light passes through an optical record medium other than a light reflection method in which light is reflected by an optical record medium.

In the invention, a diffraction grating for plural wavelengths, an optical pickup apparatus and an optical disk apparatus in which an increase in light quantity loss or wave front aberration is not caused and also transmittance of light can be increased can be obtained.

What is claimed is:

1. An optical pickup apparatus comprising:
   a light source portion in which a first semiconductor laser light source and a second semiconductor laser light source for respectively emitting light of a first wavelength and a second wavelength which are at least two different wavelengths are provided inside the same package;

a converging optical system in which a first light beam having the first wavelength emitted from the first semiconductor laser light source and a second light beam having the second wavelength emitted from the second semiconductor laser light source respectively pass through an objective lens placed in a position opposed to an optical record medium and thereby each the light beam is caused to converge on the optical record medium;

a photodetector for receiving a light beam for detection reflected by the optical record medium and outputting a current;

a light detection optical system for guiding the light beam for detection to the photodetector, a diffraction grating for plural wavelengths including:

two or more first grating regions which have periodic protrusions and depressions in sectional shape and extend in a first direction perpendicular to a repeat direction of the protrusions and depressions, and two or more second grating regions which have periodic protrusions and depressions in sectional shape and have the depressions set to depths different from groove depths of the depressions of the first grating regions and extend in the first direction perpendicular to the repeat direction of the protrusions and depressions, wherein the two or more first and the two or more second grating regions are alternately and repeatedly placed in a second direction perpendicular to the first direction and in a direction perpendicular to an incident direction of light so that all the protrusions and depressions are located in the same surface side and thereby both the grating regions are constructed in striped shape;

each one of the second grating regions is arranged between adjacent two of the first grating regions in the second direction;

groove depths of each the depressions of the first and the second grating regions are set so that the first grating regions transmit incident light of a first wavelength and also diffract incident light of a second wavelength different from the first wavelength and the second grating regions transmit incident light of the second wavelength and also diffract incident light of the first wavelength; and the diffraction grating for plural wavelengths is placed between the objective lens and the light source portion of the converging optical system so that a longitudinal direction of each of the grating regions in the objective lens portion is aligned with a radial direction of the optical record medium.

2. An optical pickup apparatus comprising:

a light source portion for emitting light of a first wavelength and a second wavelength which are at least two different wavelengths;

a converging optical system for respectively causing a first light beam having the first wavelength emitted from the light source portion and a second light beam having the second wavelength emitted from the light source portion to converge on an optical record medium;

a photodetector for receiving a light beam for detection reflected by the optical record medium or passing through the optical record medium and outputting a current; and a diffraction grating for plural wavelengths including:

a first grating portion including two or more first grating regions each of which has periodic protrusions and depressions in sectional shape and which extends in a first direction; and a second grating portion including two or more second grating regions each of which has periodic protrusions and depressions in sectional shape and has the depressions set to depths different from groove depths of the depressions of the first grating portion, the second grating region which extends in the first direction, wherein the first and the second grating portions are adjacently placed in a second direction perpendicular to the first direction and in a direction perpendicular to an incident direction of light;

the second grating portion is arranged between two parts of the first grating portion in the second direction;

groove depths of each the depressions of the first and the second grating portions are set so that the first grating portion transmits incident light of a first wavelength and also diffracts incident light of a second wavelength different from the first wavelength and the second grating portion transmits incident light of the second wavelength and also diffracts incident light of the first wavelength; and the diffraction grating for plural wavelengths is placed between the light source portion and the photodetector.

3. An optical disk apparatus comprising:

an optical pickup apparatus including:

a light source portion for emitting light of a first wavelength and a second wavelength which are at least two different wavelengths;

a converging optical system for respectively causing a first light beam having the first wavelength emitted from the light source portion and a second light beam having the second wavelength emitted from the light source portion to converge on an optical record medium;

a photodetector for receiving a light beam for detection reflected by the optical record medium or passing through the optical record medium and outputting a current; and a diffraction grating for plural wavelengths including: a first grating portion including two or more first grating regions each of which has periodic protrusions and depressions in sectional shape and which extends in a first direction; and a second grating portion including two or more second grating regions each of which has periodic protrusions and depressions in sectional shape and has the depressions set to depths different from groove depths of the depressions of the first grating portion, the second grating region which extends in the first direction;

a slide feed mechanism for moving this optical pickup apparatus in a radial direction of an optical record medium; and a reproduction circuit for outputting a signal from the optical pickup apparatus as a reproduction signal, wherein the first and the second grating portions are adjacently placed in a second direction perpendicular to the first direction and in a direction perpendicular to an incident direction of light;

the second grating portion is arranged between two parts of the first grating portion in the second direction;

groove depths of each the depressions of the first and the second grating portions are set so that the first grating portion transmits incident light of a first wavelength and also diffracts incident light of a second wavelength different from the first wavelength and the second grating portion transmits incident light of the second wavelength and also diffracts incident light of the first wavelength; and the diffraction grating for plural wavelengths is placed between the light source portion and the photodetector.

4. The optical disk apparatus according to claim 1, wherein the diffraction grating further includes grooves formed by the protrusions and the depressions, and each groove includes a bottom surface that is perpendicular to the groove depths of the depressions.

5. The optical disk apparatus according to claim 2, wherein the diffraction grating further includes grooves formed by the protrusions and the depressions, and each groove includes a bottom surface that is perpendicular to the groove depths of the depressions.

6. The optical disk apparatus according to claim 3, wherein the diffraction grating further includes grooves formed by the protrusions and the depressions, and each groove includes a bottom surface that is perpendicular to the groove depths of the depressions.

* * * * *